(12) United States Patent
Hieber

(10) Patent No.: US 8,694,198 B2
(45) Date of Patent: Apr. 8, 2014

(54) METHOD FOR ACCESSING CONTROL UNITS ARRANGED IN A VEHICLE, CONTROL PROGRAM AND COMMUNICATION CONTROL UNIT

(75) Inventor: Detlev Hieber, Karlsruhe (DE)

(73) Assignee: Siemens AG, Munich (DE)

( * ) Notice: Subject to any disclaimer, the term of this patent is extended or adjusted under 35 U.S.C. 154(b) by 931 days.

(21) Appl. No.: 12/839,944

(22) Filed: Jul. 20, 2010

(65) Prior Publication Data
US 2011/0022757 A1  Jan. 27, 2011

(30) Foreign Application Priority Data
Jul. 21, 2009 (EP) .................................... 09009428

(51) Int. Cl.
*B60R 16/02* (2006.01)
*G01M 17/00* (2006.01)
*G06F 9/445* (2006.01)

(52) U.S. Cl.
USPC ........................................ 701/31.4; 701/29.6

(58) Field of Classification Search
None
See application file for complete search history.

(56) References Cited

U.S. PATENT DOCUMENTS

| 5,563,788 A | 10/1996 | Yoon |
| 6,694,235 B2 * | 2/2004 | Akiyama ..................... 701/29.6 |
| 2007/0030844 A1 | 2/2007 | Fukuta et al. |
| 2010/0115120 A1 * | 5/2010 | Staiger ......................... 709/231 |

FOREIGN PATENT DOCUMENTS

| DE | 44 33 745 | 3/1995 |
| DE | 10 2006 009 585 | 6/2007 |
| WO | WO 2007/065585 | 6/2007 |

* cited by examiner

*Primary Examiner* — Michael J Zanelli
(74) *Attorney, Agent, or Firm* — Cozen O'Connor

(57) ABSTRACT

For control unit access, a vehicle to be checked is identified using an identifier. Control and/or monitoring operations covered by the control unit access are selected. A communication link is set up over a selected vehicle communication interface. Communication devices covered by the selected vehicle communication interface are ascertained. Independent control and/or monitoring operations covered by the control unit access are ascertained, where these operations are associated with available communication means and are not dependent on a superordinate control and/or monitoring operation. A control and/or monitoring operation, which has the greatest number of subordinate dependent control and/or monitoring operations, is selected for execution.

13 Claims, 3 Drawing Sheets

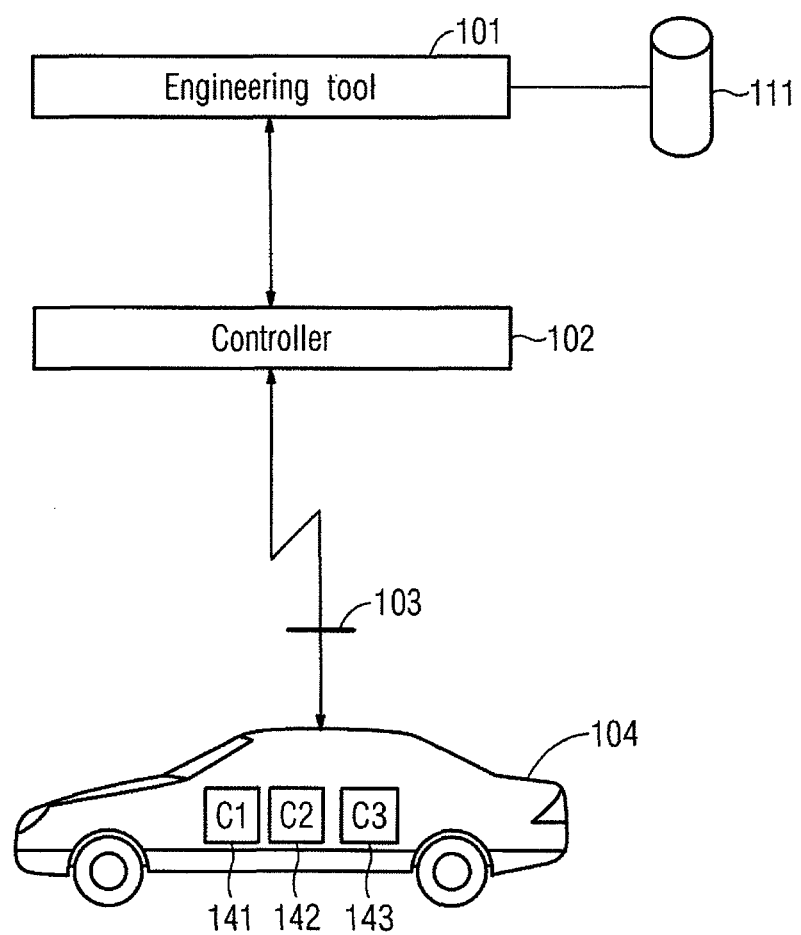

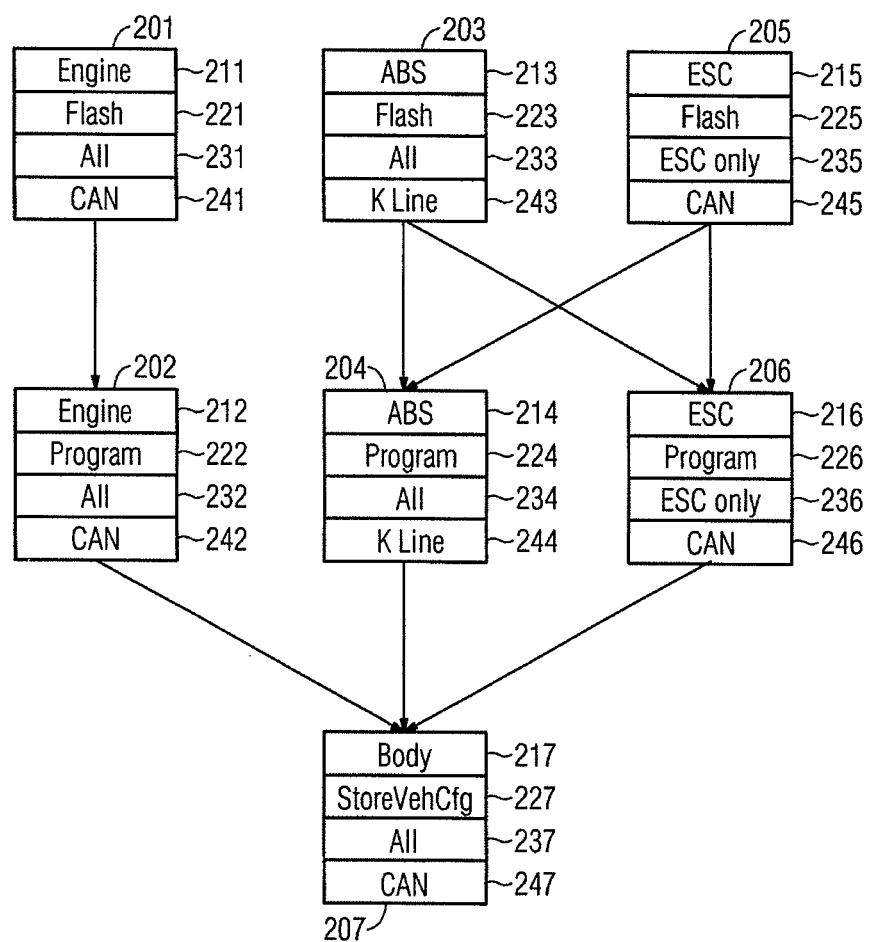

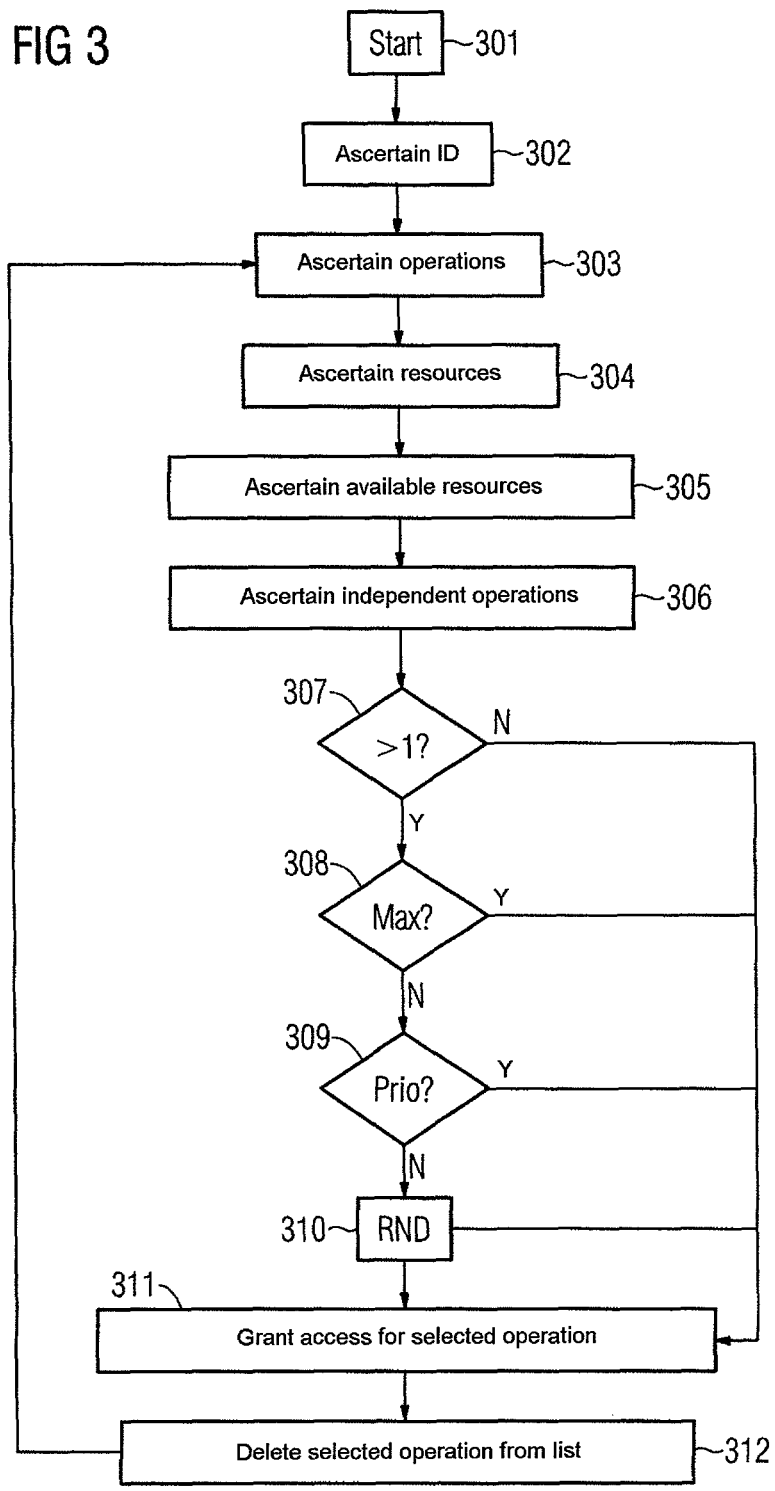

METHOD FOR ACCESSING CONTROL UNITS ARRANGED IN A VEHICLE, CONTROL PROGRAM AND COMMUNICATION CONTROL UNIT

BACKGROUND OF THE INVENTION

Modern motor vehicles contain numerous control units to which read or write access is effected, such in the course of inspections during a production process or during servicing or maintenance work. In numerous situations that arise during vehicle manufacture or diagnosis, multiple control unit access operations can occur in parallel, i.e., when multiple or multichannel vehicle communication interfaces are used. Here, a control unit or the firmware thereof, or a production environment needs to take account of conditional order dependencies between individual access operations per control unit and between control units. Furthermore, it is frequently not possible for all control unit access operations to take place using any vehicle communication interface or interface resource.

The order dependencies, or flow control models mapping said dependencies, are the subject of frequent adjustments. Additionally, advance planning of control unit access operations is problematic, particularly in view of a diversity of equipment variants which needs to be taken into account during vehicle manufacture. This is because control units arranged in a vehicle which is to be checked are frequently not known before the start of a check and can be ascertained only in the course of the check. Advance planning of the control unit access operations for all possible permutations of equipment characteristics would also be extremely inefficient.

In line with previous solutions, control unit access operations for a standardized subset of control units installed in a vehicle product range are planned manually. In this case, groups of control units are formed. It is possible for control unit access operations to be parallelized between the control units of each group. Outside of the groups, parallel control unit access is not possible for control units which are associated with different groups. This means that control unit access operations can be planned only incompletely and with little resource efficiency.

SUMMARY OF THE INVENTION

It is therefore an object of the present invention to provide a method for accessing control units arranged in a vehicle which allows optimized utilization of resources of a vehicle communication interface for complex control unit access operations, and also suitable implementation of the method.

This and other objects and advantages are achieved in accordance with the invention by a method, having a control program and by a communication control unit in which a combination of possible control and/or monitoring operations which require access to control units arranged in vehicles is ascertained and stored in a database associated with an engineering tool. For a control unit access operation, a vehicle to be checked is initially identified using an identifier. Additionally, control and/or monitoring operations covered by the control unit access are selected. Moreover, a communication link is set up over a selected vehicle communication interface. Furthermore, communication devices covered by the selected vehicle communication interface are ascertained. Independent control and/or monitoring operations covered by the control unit access are ascertained, which are associated with available communication devices and are not dependent on a superordinate control and/or monitoring operation of the control unit access. For each available communication devices, a control and/or monitoring operation, which has the greatest number of subordinate dependent control and/or monitoring operations, such as along a path within a tree structure, is selected for execution from the ascertained independent control and/or monitoring operations. Finally, access to communication devices and control units which are associated with the control and/or monitoring operation selected for execution is granted.

An advantage provided by the present invention is that continuous and resource-efficient planning of control unit access operations is made possible by taking into account all of the vehicle variants in a vehicle product range. Moreover, there is no longer any frequently error-prone manual estimation of execution times for individual control unit access operations in order to ascertain a time- and resource-optimized access sequence. Overall, it is thus possible to automatically achieve optimized utilization of resources of a vehicle communication interface for control and monitoring operations during vehicle manufacture or diagnosis.

If the number of subordinate dependent control and/or monitoring operations is the same as for the ascertained independent control and/or monitoring operations, one preferred embodiment of the present invention provides for the control and/or monitoring operation which has a higher associated priority in comparison to be selected for execution. Here, the priority can be ascertained implicitly using a path length within a tree structure. This allows priorities of control and/or monitoring operations to be taken into account for optimized planning of control unit access operations.

A control and/or monitoring operation selected for execution is advantageously deleted from a list of the control and/or monitoring operations covered by the control unit access when it has been executed. The control and/or monitoring operation which has the greatest number of subordinate dependent control and/or monitoring operations or the highest priority can then be reselected for execution.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which:

FIG. 1 is an illustration of a schematic block diagram of a vehicle diagnosis system in which the method in accordance with the invention is implemented;

FIG. 2 is an illustration of a schematic block diagram of hierarchically dependent objects for mapping a flow control model for the vehicle diagnosis system of FIG. 1; and FIG. 3 is an illustration of a flowchart of a method for accessing control units arranged in a vehicle in accordance with an embodiment of the invention.

DETAILED DESCRIPTION OF THE PRESENTLY PREFERRED EMBODIMENTS

The vehicle diagnosis system shown in FIG. 1 comprises an engineering tool 101 for configuring the vehicle diagnosis system, a controller 102 for reading and writing control unit parameters and at least one vehicle communication interface 103 for accessing control units 141, 142, 143 arranged in a vehicle 104 that is to be checked or set. In one embodiment, the controller 102 comprises a mobile diagnosis unit or a computer unit which initiates and controls a diagnosis or configuration operation. A communication link between the controller 102 and the vehicle 104 can be set up by wire or by a radio interface.

The engineering tool 101 is used to completely record control and/or monitoring operations which are relevant to diagnosis or configuration operations for all of the vehicle variants in a range of models from a manufacturer. Moreover, the engineering tool 101 is used to record dependencies between the ascertained control and/or monitoring operations and to store them in a database 111 associated with the engineering tool 101. Furthermore, the engineering tool 101 is used to ascertain associations between the recorded control and/or monitoring operations and prescribable equipment characteristics and respective required communication resources and to store them in the database 111.

All control and/or monitoring operations recorded in the database 111, the dependencies between the control and/or monitoring operations and the associations of the control and/or monitoring operations are mapped by the engineering tool 101 in a flow control model which takes account of order dependencies. Within the flow control model, the dependencies between the control and/or monitoring operations are mapped in a graph for the purpose of simplified analysis. Also, validity rules are created and mapped in the flow control model for the purpose of describing equipment characteristics. The validity rules are evaluated when a control unit access request is processed during a diagnosis or configuration operation.

The objects 201-207 of the flow control model, which are shown by way of example in FIG. 2, represent possible control and/or monitoring operations which have hierarchic dependencies during complex diagnosis and configuration operations. Each of the objects 201-207 comprises details or associations for the respective vehicle component 211-217, for the type of operation 221-227, for the valid equipment characteristic 231-237 and for required communication resources 241-247.

In the present example, the hierarchically superordinate operation "Body-StoreVehCfg", represented by the object 207, for storing a vehicle configuration has dependencies relating to the objects 202, 204, 206. The objects 202, 204, 206 represent the operations "Engine-Program", "ABS-Program" and "ESC-Program" for programming the vehicle components Engine control, Antilock braking system and Electronic stability control denoted by the statements 212, 214, 216. The operations "Engine-Program", "ABS-Program" and "ESC-Program" in turn have dependencies relating to the hierarchically subordinate operations "Engine-Flash", "ABS-Flash" and "ESC-Flash", represented by the objects 201, 203, 205, for overwriting firmware of the vehicle components denoted by the statements 211, 213, 215. Here, dependencies also exist crosswise between the operations "ABS-Program" and "ESC-Flash", on the one hand, and "ABS-Flash" and "ESC-Program", on the other hand.

Consistent with the example shown in FIG. 2, the objects 201-204 are valid for all vehicle variants based on the statements 231-234, 237 "All", whereas the objects 205-206 are valid only for vehicles with electronic stability control based on the statements 235-236. Furthermore, the associations 241-242, 245-247 "CAN" denote that the operations "Engine-Flash", "Engine-Program", "ESC-Flash", "ESC-Program" and "Body-StoreVehCfg" require CAN-bus access. By contrast, the operations "ABS-Flash", "ABS-Program" require access over a K line, according to the associations 243-244 "K Line".

With reference to the flowchart shown in FIG. 3, the start of a diagnosis or configuration operation (step 301) is initially followed by identification of the vehicle which is to be checked or set (step 302). By way of example, this is achieved by ascertaining a chassis number. Subsequently, control and/or monitoring operations covered by the started diagnosis or configuration operation are ascertained (step 303) which require control unit access. Following the setup of a communication link over at least one selected vehicle communication interface, such as a Controller Area Network (CAN) bus or K line, communication resources covered by the selected vehicle communication interface are ascertained (step 304). By way of example, the communication resources may be communication channels provided by the vehicle communication interface.

Following the ascertainment of available communication resources (step 305), independent control and/or monitoring operations are ascertained (step 306) which are associated with available communication resources and are not dependent on a superordinate control and/or monitoring operation which is likewise covered by the started diagnosis or configuration operation. Here, independent control and/or monitoring operations are ascertained in parallel for all available communication resources to achieve optimum utilization of communication resources that are available in parallel.

If a started diagnosis or configuration operation covers the operations "Engine-Program", "ABS-Program", "ESC-Flash", "ESC-Program" and "Body-StoreVehCfg", for example, in accordance with the flow control model depicted in FIG. 2, step 306 then ascertains "Engine-Program", "ABS-Program" and "ESC-Flash" as independent control and/or monitoring operations.

Step 307 ascertains whether there is more than one independent control and/or monitoring operation. If there is only one independent control and/or monitoring operation, the operation is selected for execution and access to communication resources and control units which are associated with the control and/or monitoring operation selected for execution is granted (step 311). When it has been executed, the control and/or monitoring operation selected for execution is deleted from a list of the control and/or monitoring operations covered by the diagnosis or configuration operation (step 312). Next, step 303 involves reascertaining remaining control and/or monitoring operations within the started diagnosis or configuration operation. Subsequently, the control and/or monitoring operation having the greatest number of subordinate dependent control and/or monitoring operations along a path within a tree structure is possibly reselected for execution from the remaining control and/or monitoring operations.

If a plurality of independent control and/or monitoring operations are ascertained in line with step 307, step 308 involves the control and/or monitoring operation which has the greatest number of subordinate dependent control and/or monitoring operations along a path being selected for execution from the ascertained independent control and/or monitoring operations. By way of example, this takes account of only subordinate dependent control and/or monitoring operations along a path in a graph which maps dependencies between the control and/or monitoring operations.

If the number of subordinate dependent control and/or monitoring operations is the same, step 309 involves the control and/or monitoring operation which has a higher associated priority in comparison being selected for execution from the ascertained independent control and/or monitoring operations. The priority is preferably ascertained implicitly using the aforementioned path length within a tree structure. If a plurality of control and/or monitoring operations have the same priority on the basis of the comparison in step 309, then a control and/or monitoring operation is selected using a random principle (step 310).

The above-described method is preferably implemented by a control program which can be loaded into a main memory of a computer unit, such as the controller 102 shown in FIG. 1. The control program has at least one code section, the execution of which prompts the performance of the steps of the described method when the control program is executed in the computer unit that includes a processor.

Thus, while there have shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for accessing control units arranged in a vehicle using at least one vehicle communication interface, comprising:
   determining a combination of possible operations which require access to at least one of a plurality of control units arranged in vehicles, the possible operations including at least one of a control operation and a monitoring operation;
   identifying, by an identifier, a vehicle for which access to at least one of said plural control units is sought;
   determining the operations that are covered by the access that is sought;
   setting up a communication link over a selected vehicle communication interface;
   determining available communication devices covered by the selected vehicle communication interface;
   determining, from the possible operations covered by the access that is sought, at least one independent operation that is associated with the available communication devices and that is not dependent on a superordinate one of the operations covered by the access that is sought;
   for each available communication device, selecting one of the possible operations having a greatest number of subordinate operations for execution; and
   granting access to the communication devices and the control units associated with the one of the possible operations selected for execution.

2. The method as claimed in claim 1, wherein the step of selecting comprises selecting one of the possible operations having a greatest number of subordinate operations along a path within a tree structure from the at least one independent operation.

3. The method as claimed in claim 2, wherein the step of determining a combination includes combining the possible operations using an engineering tool;
   wherein the engineering tool is used to determine dependencies between the determined operations, and
   wherein the engineering tool is used to determine associations between the determined operations and at least one of prescribable equipment characteristics and respective required communication devices.

4. The method as claimed in claim 1, wherein the step of determining a combination includes combining the possible operations using an engineering tool;
   wherein the engineering tool is used to determine dependencies between the determined operations, and
   wherein the engineering tool is used to determine associations between the determined operations and at least one of prescribable equipment characteristics and respective required communication devices.

5. The method as claimed in claim 4, wherein the combination of possible operations, dependencies between the operations and the determined associations of the operations are mapped in a flow control model which takes account of order dependencies.

6. The method as claimed in claim 5, wherein the dependencies between the operations are mapped in a graph.

7. The method as claimed in claim 4, wherein the dependencies between the operations are mapped in a graph.

8. The method as claimed in claim 1, wherein validity rules, which are evaluated when a control unit access request is processed, are created for describing equipment characteristics.

9. The method as claimed in claim 1, wherein the communication link is setup over the selected vehicle communication interface between one of said plural control units, a monitoring unit and each of said plural control units arranged in the vehicle.

10. The method as claimed in claim 1, wherein the one of the operations having a higher associated priority is selected for execution from the determined at least one of the independent operations if a number of subordinate operations is the same.

11. The method as claimed in claim 1, wherein the at least one of the operations selected for execution is deleted from a list of the operations covering said access by at least one of said plural control units upon expiration, and wherein the operation having a greatest number of at least one of the subordinate operations is reselected for execution.

12. A non-transitory computer readable medium having a computer program product for executing on a processor which, when used on a computer apparatus causes control of access of a plurality of control units arranged in a vehicle using at least one vehicle communication interface, the computer program comprising:
   program code for determining a combination of possible operations which require access to at least one of a plurality of control units arranged in vehicles, the possible operations including at least one of a control operation and a monitoring operation;
   program code for identifying, by an identifier, a vehicle for which access to at least one of said plural control units is sought;
   program code for determining the operations that are covered by the access that is sought;
   program code for setting up a communication link over a selected vehicle communication interface;

program code for determining available communication devices covered by the selected vehicle communication interface;

program code for determining, from the possible operations covered by the access that is sought, at least one independent operation that is associated with the available communication devices and that is not dependent on a superordinate one of the operations covered by the access that is sought;

for each available communication device, program code for selecting one of the possible operations having a greatest number of subordinate operations for execution; and program code for granting access to the communication devices and the control units associated with the one of the possible operations selected for execution.

13. A communication control unit comprising:

means for determining a combination of possible operations which require access to at least one of a plurality of control units arranged in vehicles, the possible operations including at least one of a control operation and a monitoring operation;

means for identifying, by an identifier, a vehicle for which access to at least one of said plural control units is sought;

means for determining the operations that are covered by the access that is sought;

means for setting up a communication link over a selected vehicle communication interface;

means for determining available communication devices covered by the selected vehicle communication interface;

means for determining, from the possible operations covered by the access that is sought, at least one independent operation that is associated with the available communication devices and that is not dependent on a superordinate one of the operations covered by the access that is sought;

for each available communication device, means for selecting one of the possible operations having a greatest number of subordinate operations for execution; and means for granting access to the communication devices and the control units associated with the one of the possible operations selected for execution.

* * * * *